Patented Oct. 13, 1936

2,057,414

UNITED STATES PATENT OFFICE 2,057,414

OIL FILTERING ELEMENT AND PROCESS OF MAKING THE SAME

Southwick W. Briggs and Chester G. Gilbert, Washington, D. C.

No Drawing. Application March 28, 1935, Serial No. 13,533

16 Claims. (Cl. 252—2)

The object of this invention is to provide means for consolidating adsorbent materials such as fuller's earth, activated alumina, activated charcoal, glaucosil, acid-treated zeolites, etc., without interference with the micro-cellular porosity on which property the adsorbent properties of these materials depend.

These mineral adsorbents are normally in granular form, and, owing to the cellular structure, are more or less friable. For certain uses the unconsolidated form is satisfactory; for others bonding would be of definite value. Among the objections to direct use (i. e., use in unconsolidated form) are the following:

(1) *Channelling.*—Experience has shown that it is practically impossible to maintain a uniform rate of flow throughout a bed of any extent and depth, the tendency being to develop channels of lowered resistance to flow, lessening, if not destroying, the efficiency of the operation.

(2) *Attrition.*—The sustained flow of liquid through a bed is bound to develop more or less movement of the individual grains in relation to one another, which, in view of the friableness inherent in the micro-structure of the grains, causes the development of fines tending to slime and interfere both with the freedom of flow and with adsorption.

(3) *Classification.*—Long sustained flow of a liquid through a bed in one direction tends toward a progressive segregation of materials in terms of particle size. In addition to being largely responsible for the effects above mentioned, this gives rise to a progressive compacting and stratification of the bed as a whole.

Attempts to cement, bond or otherwise consolidate the component grains are confronted with the problem of effecting a bond without closing the pore openings on the surfaces of the individual grains, thus interfering with if not destroying the adsorptive property. Our invention consists in the development of a means for accomplishing this and thereby enabling the consolidation of the adsorbent material into unitary masses, e. g., molded forms, without detriment to the micro-structure.

For this purpose, we employ preferably a cementing medium which, in addition to the normal requirements in the way of strength, resistance to chemical influence, etc., develops its set through the elimination of a solvent liquid and in the course of developing this set attains or passes through a rigid solution stage. We have employed various cementing or bonding media with only such modifications in procedure as are obvious in the varying properties, but have found that for general purposes sodium silicate gives the best results. The procedure may best be described by detailing what followed in the case of a given adsorbent along with a given bonding medium, and for this purpose fuller's earth and sodium silicate are selected as the adsorbent most extensively used, and the preferred cementing agent, respectively.

As water is abstracted from a sodium silicate solution, the solution becomes increasingly viscous until a point is reached; normally, when the sodium silicate solution still contains around 40% of water, where the solution while still definitely fluid requires only the withdrawal of another percent or two of water to be rendered rigid. If this solution, carrying just sufficient water to render it fluid and miscible with fuller's earth but at the same time close to rigidity in the matter of water content, be intimately mixed with activated fuller's earth, the adsorbent grains will have the effect of extracting water therefrom and causing the mass to set. If the viscosity of the silicate is sufficiently great, the adsorbent will extract the water from the solution without sucking the silicate itself into the pores of the adsorbent. Moreover, in abstracting the moisture through the semi-rigid stage to that of final rigidity, micro-channels are opened up in the silicate which communicate with the pores of the adsorbing grains, thus giving a set which leaves the initial porosity of the grains undamaged. This is the principle on which the operation depends; namely, that of causing solvent liquid to be abstracted from the cementing or bonding medium at a rate more rapid than is the rate of adjustment of the cement to the point of rigidity, whereby pores are developed in the cementing material, which pores intercommunicate with those of the adsorbent grains. In bringing this about, certain precautions involving rigorously exact control are called for as follows:

(1) The sodium silicate solution must be sufficiently viscous, as otherwise instead of extracting and drawing water into the pores leaving the silicate behind, the adsorbent will draw silicate into the pores and seal them.

(2) The sodium silicate must be sufficiently liquid to admit of mixing with and coating the adsorbent grains, giving a uniform thin-layer distribution that is everywhere within the influence of the adsorbent, as otherwise interconnecting microporosities between the grains and cement, opening into the interstitial spaces between grains, will not develop.

(3) It is desirable, if not absolutely essential, that the adsorbent material be fully dehydrated when admixed with the bonding medium, as the presence of moisture even in minute quantities adsorbed in the pore spaces facilitates the adsorbent effect on the water in the sodium silicate, thus causing the set to be too rapid to admit of mixing and forming.

Applying the process to the production of molded fuller's earth forms, we use an earth which has been fully roasted at a temperature preferably around 1100° F. and thereafter not exposed to the air more than is absolutely necessary prior to use. This is put in a positive mixer and to it is added the proper amount of sodium silicate of a viscosity of about 150,000 poises, carrying approximately 40% of water; thus 1 part of the viscous sodium silicate solution to 3 or 4 parts of the fuller's earth gives a satisfactory bond. The proportion of sodium silicate may be increased beyond the above figure, depending upon the degree of stoniness required, without depreciating the adsorptive efficiency of the resulting product. The two are then mixed through as short an interval as is consistent with obtaining complete distribution, and the batch is molded as quickly as possible. In this connection we have found that addition of a drop or two of an alkaline indicator such as phenolphthalein to the water glass serves to give an indication of the thoroughness of the mixing, thereby avoiding unnecessary manipulation of the mass. By having the adsorbent fully roasted and in the proper dehydrated state, and by having the proper amount of water in the sodium silicate, it is possible to attain as much as a ten-minute interval for mixing and casting before rigidity obtains. The product, after shaping, is allowed to stand preferably for several hours, whereby to afford opportunity for the adsorbent to work on the silicate. It is then slowly dried and baked in the manner usual in connection with the use of sodium silicate as cement, after which it may be leached or otherwise treated for the elimination of the free alkali, and as a final step reactivated in readiness for use. In reactivating, the object is slowly dried and baked to temperatures in keeping with standard practice in the activation of fuller's earth.

For special uses the product thus prepared may prove to be insufficiently alkali-free, or if so too brittle. We have found a means of overcoming these objections by introducing into the mixture of adsorbent and bonding medium a base, such as zinc oxide, that is replaceable with the alkali, which base reacts with the sodium silicate to form a silicate of the requisite stability and strength. We prefer to use for this purpose a base such as zinc oxide which reacts but slowly with sodium silicate in the cold, and when mixed with the adsorbent prior to the addition of the sodium silicate, has little or no opportunity for reaction in the brief period before the adsorbent has withdrawn sufficient water to cause the silicate to set. When, after slowly drying, the temperature of the molded product containing the base is gradually raised to around 482° F., the zinc oxide reacts actively, replacing the soda and forming zinc silicate pseudomorphic after the porous sodium silicate. After being leached and reactivated, the final product may be rendered alkali-free and at the same time of a tough, hard, stony consistency.

According to the embodiment just described, in which the sodium of the sodium silicate is more or less completely replaced by another base, e. g., zinc oxide, or the like, we prefer to add to the mix that amount of the base which is approximately equivalent to the sodium content of the sodium silicate. For example, in a mix containing about 12 parts by weight of a viscous water glass of about 59.5° Baumé specific gravity and analyzing about 18% $Na_2O$ to about 36% $SiO_2$, we prefer to add 1 part by weight of zinc oxide.

In the molding of the mass, the latter is consolidated by application of a pressure related to the density desired in the final product: this pressure may range from just sufficient to give the desired shape all the way to the maximum load which the adsorbent material can withstand without crushing.

Any desirable mode of forming the adsorbent objects may be practiced. For example, a batch of sodium silicate zinc oxide and fuller's earth, in which the weight of the sodium silicate is to the weight of the fuller's earth as 1 is to 4, prepared as already described, introduced into a split mold of the conventional type and subjected to the pressure of plungers (preferably opposed plungers, to insure uniformity in compacting) at a pressure of 500 pounds per square inch, will yield, after baking and after treatment, a porous object comparable in strength to ordinary building brick or building tile.

By "rate of adjustment" we here mean the rate at which the cementing medium normally would accommodate itself to decrease in volume—occasioned by abstraction of solvent liquid therefrom—without the formation of voids in the mass thereof.

We have tested molded forms prepared in the foregoing manner in connection with the purification of oils, in reclaiming lubricating oil, in drying gasoline and in other connections, and found the adsorptive efficiencies to have been enhanced rather than lessened by the processing, as compared with the same adsorbent in loose, unconsolidated form.

We claim:

1. Process which comprises admixing mineral adsorbent particles in dehydrated activated form with a water glass which contains only sufficient water to maintain the same fluid, in the ratio of not more than 4 parts of the activated mineral adsorbent to 1 part of the viscous water glass, thereby abstracting water from the water glass into the adsorbent particles at a rate more rapid than is the rate of adjustment of the water glass to the point of rigidity at moderate temperature and inducing a porous set in the water glass.

2. Process which comprises admixing mineral adsorbent particles in dehydrated activated form with a water glass which contains only sufficient water to maintain the same fluid, in the ratio of not more than 4 parts of the activated mineral adsorbent to 1 part of the viscous water glass, thereby abstracting water from the water glass into the adsorbent particles at a rate more rapid than is the rate of adjustment of the water glass to the point of rigidity at moderate temperature and inducing a porous set in the water glass, and drying and tempering the resulting mass.

3. Process which comprises admixing mineral adsorbent particles in dehydrated activated form with a water glass which contains only sufficient water to maintain the same fluid, in the ratio of not more than 4 parts of the activated mineral adsorbent to 1 part of the viscous water glass, thereby abstracting water from the water glass into the adsorbent particles at a rate more rapid than is the rate of adjustment of the water glass to the point of rigidity at moderate temperature and inducing a porous set in the water glass, drying and tempering the resulting mass, and thereafter leaching the same with water and activating the leached mass.

4. Process as defined in claim 1 characterized in that the mixture contains also a base replaceable with sodium.

5. Process as defined in claim 2, characterized in that the mixture contains also a base replaceable with sodium and in that the resulting mass after drying is tempered at a temperature at which the base reacts with the water glass.

6. Process which comprises admixing mineral adsorbent particles in dehydrated activated form and zinc oxide with a water glass which contains only sufficient water to maintain the same fluid, in the ratio of not more than 4 parts of the activated mineral adsorbent to 1 part of the viscous water glass, thereby abstracting water from the water glass into the adsorbent particles at a rate more rapid than is the rate of adjustment of the water glass to the point of rigidity at moderate temperature and inducing a porous set in the water glass, drying the resulting mass, and tempering the latter at a temperature of approximately 482° F.

7. Process as defined in claim 1, in which the adsorbent is dehydrated activated fuller's earth.

8. Process which comprises admixing dehydrated activated fuller's earth with a viscous water glass of about 59.5° Baumé specific gravity and comprising about 18% $Na_2O$ and about 36% $SiO_2$, in the ratio of not more than 4 parts of the dehydrated activated fuller's earth to 1 part of the viscous water glass, at moderate temperature, molding the resulting mixture into a shape under a pressure of the order of 500 pounds per square inch, drying the shape and baking the same, leaching the baked shape with water, drying the leached mass, and reactivating the same by heating it at the desired elevated activating temperature.

9. The process defined in claim 8, characterized in that the mixture contains also zinc oxide in an amount by weight approximating one-twelfth that of the viscous water glass, and in that the molded shape is after drying baked by heating the same to a temperature equal to about 482° F.

10. As a new article of manufacture, a unitary mass of bonded mineral adsorbent particles comprising particles of activated mineral adsorbent material bonded together by means of a porous silicious solid bonding matrix produced in situ, in which latter pores largely communicate with pores of the adsorbent particles.

11. The invention defined in claim 10, in which the adsorbent material is activated fuller's earth.

12. The invention defined in claim 10, in which the porous solid bonding matrix is sodium silicate.

13. The invention defined in claim 10, in which the porous solid bonding matrix is leached sodium silicate.

14. The invention defined in claim 10, in which the porous solid bonding matrix comprises a water-insoluble metallic silicate.

15. As a new article of manufacture, a unitary mass of activated fuller's earth particles bonded together by means of a porous silicious solid binding matrix produced in situ, in which latter pores largely communicate with pores of the fuller's earth particles, the mass containing at least one part of the silicious binding matrix to 4 parts of the fuller's earth.

16. The new article of manufacture defined in claim 15, further characterized in that the silicious binding matrix comprises porous zinc silicate.

SOUTHWICK W. BRIGGS.
CHESTER G. GILBERT.